(12) United States Patent
Liu et al.

(10) Patent No.: US 9,143,074 B2
(45) Date of Patent: Sep. 22, 2015

(54) CONTROLLING METHOD OF SYNCHRONOUS MOTOR

(71) Applicant: National Taiwan University of Science and Technology, Taipei (TW)

(72) Inventors: Tian-Hua Liu, Taipei (TW); Ming-Yen Wei, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 184 days.

(21) Appl. No.: 13/873,411

(22) Filed: Apr. 30, 2013

(65) Prior Publication Data
US 2014/0103841 A1 Apr. 17, 2014

(30) Foreign Application Priority Data
Oct. 12, 2012 (TW) .............................. 101137598 A

(51) Int. Cl.
*H02P 21/00* (2006.01)
*H02P 6/00* (2006.01)
*H02P 27/00* (2006.01)

(52) U.S. Cl.
CPC ........ *H02P 21/0096* (2013.01); *H02P 21/0017* (2013.01)

(58) Field of Classification Search
CPC ... H02P 21/0035; H02P 21/06; H02P 21/146; H02P 2207/05
USPC .................. 318/400.01, 400.02, 700, 716
See application file for complete search history.

(56) References Cited

U.S. PATENT DOCUMENTS

| | | | | |
|---|---|---|---|---|
| 2006/0125439 | A1* | 6/2006 | Ajima et al. | 318/716 |
| 2006/0202481 | A1* | 9/2006 | Yasui et al. | 290/40 R |
| 2007/0132423 | A1* | 6/2007 | Ajima et al. | 318/719 |
| 2013/0093371 | A1* | 4/2013 | Akasako | 318/400.02 |

* cited by examiner

*Primary Examiner* — Eduardo Colon Santana
*Assistant Examiner* — Gabriel Agared
(74) *Attorney, Agent, or Firm* — Bacon & Thomas, PLLC

(57) ABSTRACT

A method is for controlling a synchronous motor includes a stator, a rotor with a position and a speed, a direct axis and a quadrant axis. The method includes: providing a position control, a speed control and a current control programs; executing either the position control program or the speed control program to produce a quadrant axis current; executing the current control program; detecting the synchronous motor to obtain a first, a second and a third phase currents, and digitizing the three phase currents; using the three phase currents and the quadrant axis current to calculate a direct axis current; converting the direct axis current and quadrant axis current to a direct axis voltage command and quadrant axis voltage command; executing a pulse width modulation for the direct axis and the quadrant axis voltage commands, to get a trigger signal for controlling the synchronous motor.

7 Claims, 13 Drawing Sheets

CONTROLLING METHOD OF SYNCHRONOUS MOTOR

BACKGROUND OF THE INVENTION (1) Field of the Invention

The invention relates to a controlling method of a motor, and especially relates to an adaptive controlling method of a synchronous motor.

(2) Description of the Prior Art

In traditional industry or high-tech industry, the electric motor as an indispensably apparatus. The electric motor has the advantage of small rotor inertia, good starting performance, easy to heat etc., but the control mathematical model of electric motor is a complex nonlinear system. Therefore, it is required to use more complex control technology to complete the drive and control.

The most commonly used control method is proportional-integral-derivative controller (commonly known as PID controller) in recent industry. The structure of PID controller is simple and high stability, but its parameter values are fixed, it must rely on experience or the trial and error to find the controller parameters, and manually adjusted at the scene. When the motor subject to external interference, especially nonlinear interference, the considered variables of PID controller are relative increase in the adjustment. Consequently, when design the motor control system, it is difficult to achieve good response by one group of control parameters. On the other hand, the parameters of the control system also changes because of the environmental impact, then results in the deterioration of the control performance. There are many higher control theory used in the design of the motor control system to improve control system performance, but the relative complexity enhance.

Therefore, how to provide a low complexity adaptive control architecture, so that the control parameters can be adjusted at any time with the change of command or the environment, that is the problem our technology desperately wants to solve.

SUMMARY OF THE INVENTION

The object of the invention is to provide a controlling method of the rotor speed, the rotor position, and the current of synchronous motor.

Another object of the present invention is to provide a adaptive control method of low complexity and with immediate self adjusting.

In order to achieve the above objects, the invention provides a controlling method of synchronous motor, the synchronous motor includes a stator, a rotor, a direct axis and a quadrant axis, and the rotor has position and speed. The controlling method of synchronous motor includes: providing a position control program of the rotor, a speed control program of the rotor and a current control program of the stator; executing either the position control program or the speed control program to produce a quadrant axis current; executing the current control program; detecting the synchronous motor to obtain a first phase current, a second phase current and a third phase current; digitizing the first phase current, the second phase current and the third phase current; calculating the first phase current, the second phase current, the third phase current and the quadrant axis current to obtain a direct axis current; converting the direct axis current and the quadrant axis current into a direct axis voltage command and a quadrant axis voltage command; executing a pulse width modulation for the direct axis voltage command and the quadrant axis voltage command, so as to get a trigger signal for controlling the synchronous motor.

In an embodiment, the directions of the first phase current, the second phase current, and the third phase current forming an angle of 120-degree with respect to each other, while the first phase current and the second phase current are directly measured by instrument, the third phase current is calculated by the measurement result of the first phase current and the second phase current.

In another embodiment, the step of executing the current control program further includes: producing a rotor position command; reading a rotor position of the rotor after accepting the rotor position command, then calculating a rotor speed of the rotor.

In another embodiment, the step of executing the position control program further includes: producing a rotor position command; reading a rotor position after accepting the rotor speed command, then calculating a rotor speed.

In another embodiment, the controlling method of synchronous motor further includes: providing a desired output current and an actual output current, and applying the least-mean-square algorithm with the nonlinear programming optimization to make the error between the desired output current and the actual output current converge to zero.

In another embodiment, the controlling method of synchronous motor further includes: providing a desired rotor speed and an actual rotor speed, and applying the least-mean-square algorithm with the nonlinear programming optimization to make the error between the desired rotor speed and the actual rotor speed converge to zero.

In another embodiment, the controlling method of synchronous motor further includes: providing a desired rotor position and an actual rotor position, and applying the least-mean-square algorithm with the nonlinear programming optimization to make the error between the desired rotor position and the actual rotor position converge to zero.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
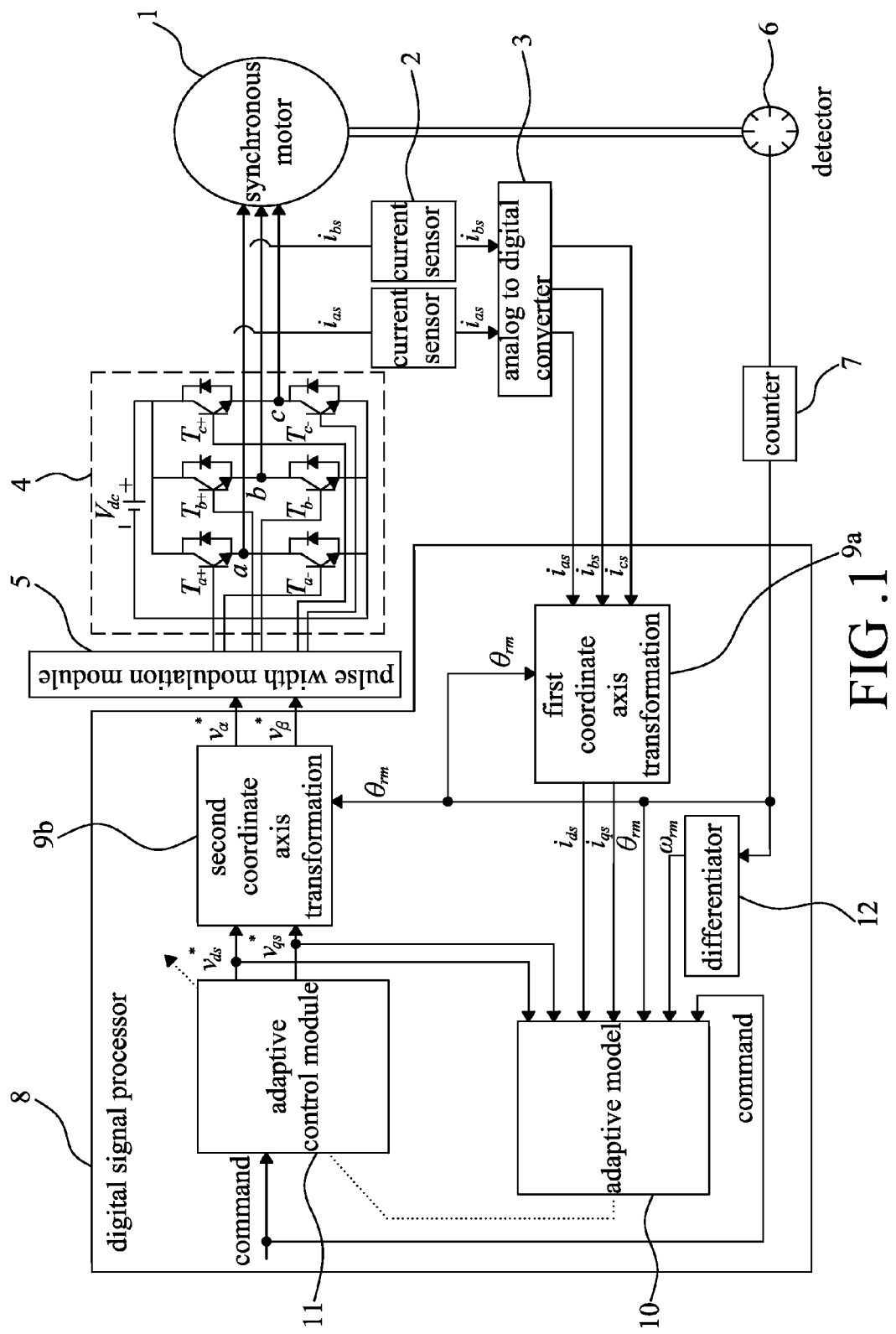
FIG. 1 is the block diagram of a synchronous motor and the control system of the synchronous motor.

Refer to FIG. 1, it is a diagram of a control system of a synchronous motor 1 in the present invention. The synchronous motor includes synchronous reluctance motor, interior permanent magnet synchronous motor, surface-mounted permanent magnet synchronous motor and insert permanent magnet synchronous motor. The control system of the synchronous motor 1 includes a current sensor 2, an analog to digital converter 3, an inverter 4, a pulse width modulation module 5, a detector 6, a counter 7 and a digital signal processor 8 including a differentiator 12. The internal operating method of the digital signal processor 8 include a first coordinate axis transformation 9a, a second coordinate axis transformation 9b, an adaptive model 10, an adaptive control module 11.

Figure 2:
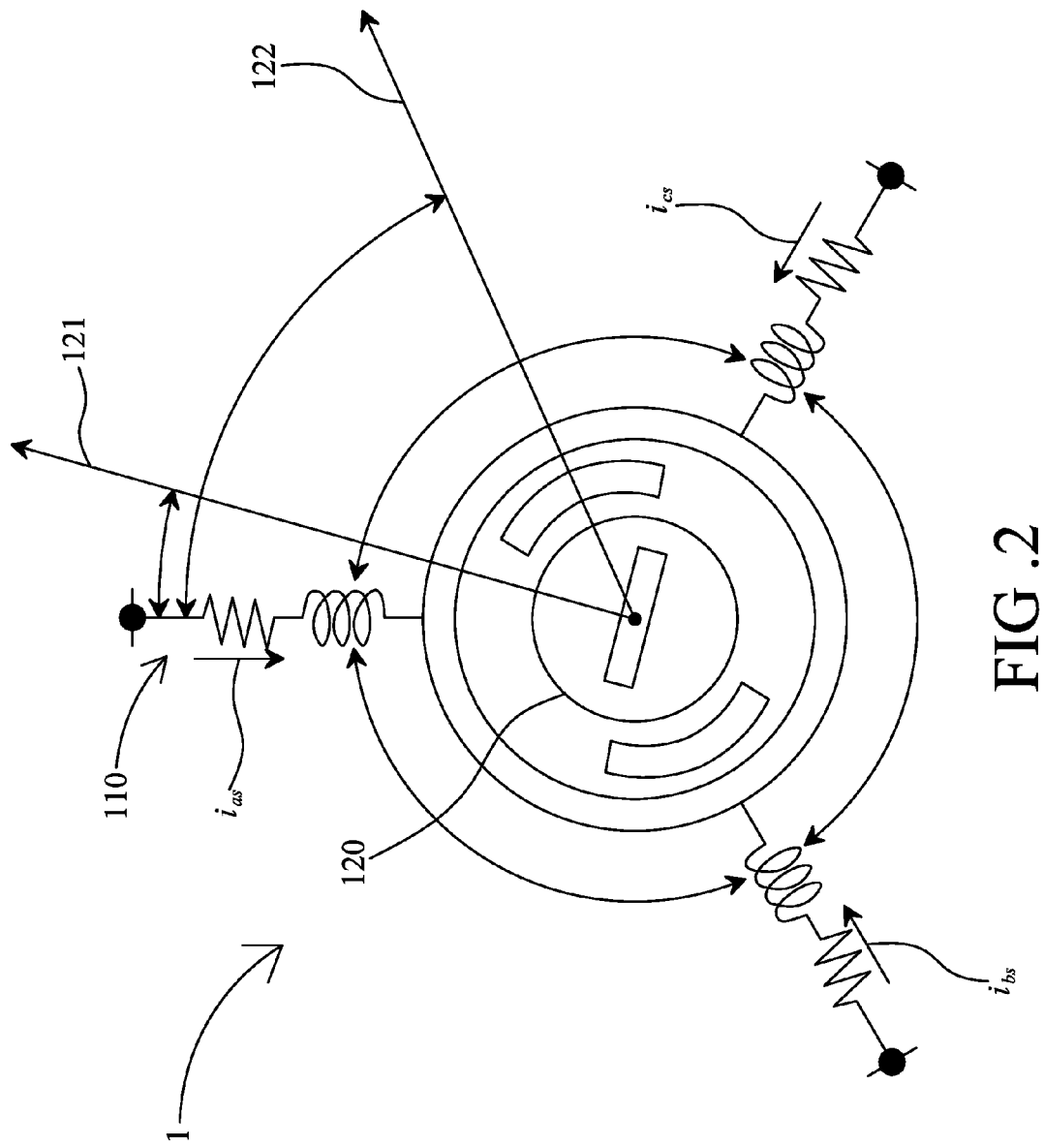
FIG. 2 is the synchronous motor of present invention.

Refer to FIG. 2, it is the synchronous motor 1 in present invention. The synchronous motor 1 includes a stator 110, a rotor 120, a direct axis 121 and a quadrant axis 122. Detecting the synchronous motor 1 can obtain a first phase current $i_{as}$ a second phase current $i_{bs}$ and a third phase current $i_{cs}$. The directions of the first phase current $i_{as}$, the second phase current $i_{bs}$ and the third phase current $i_{cs}$ are formed a 120-degree included angle to each other, while the first phase current $i_{as}$ and the second phase current $i_{bs}$ are directly measured by the current sensor 2, the third phase current $i_{cs}$ is calculated by the measurement results of the first phase current $i_{as}$ and the second phase current $i_{bs}$. However, the third phase current $i_{cs}$ can also be directly measured by the current sensor 2. In this embodiment, it is adopted calculation to obtain the third phase current $i_{cs}$, in order to reduce the cost of one current sensor 2. The rotor 120 has a speed and a position, the direct axis 121 and the quadrant axis 122 are rotated with the rotor 120. Making the first phase current $i_{as}$, the second phase current $i_{bs}$ and the third phase current $i_{cs}$ projected to the direct axis 121 and the quadrant axis 122 so that can produce a quadrant axis current $i_{qs}$ and a direct axis current $i_{ds}$.

Figure 3:
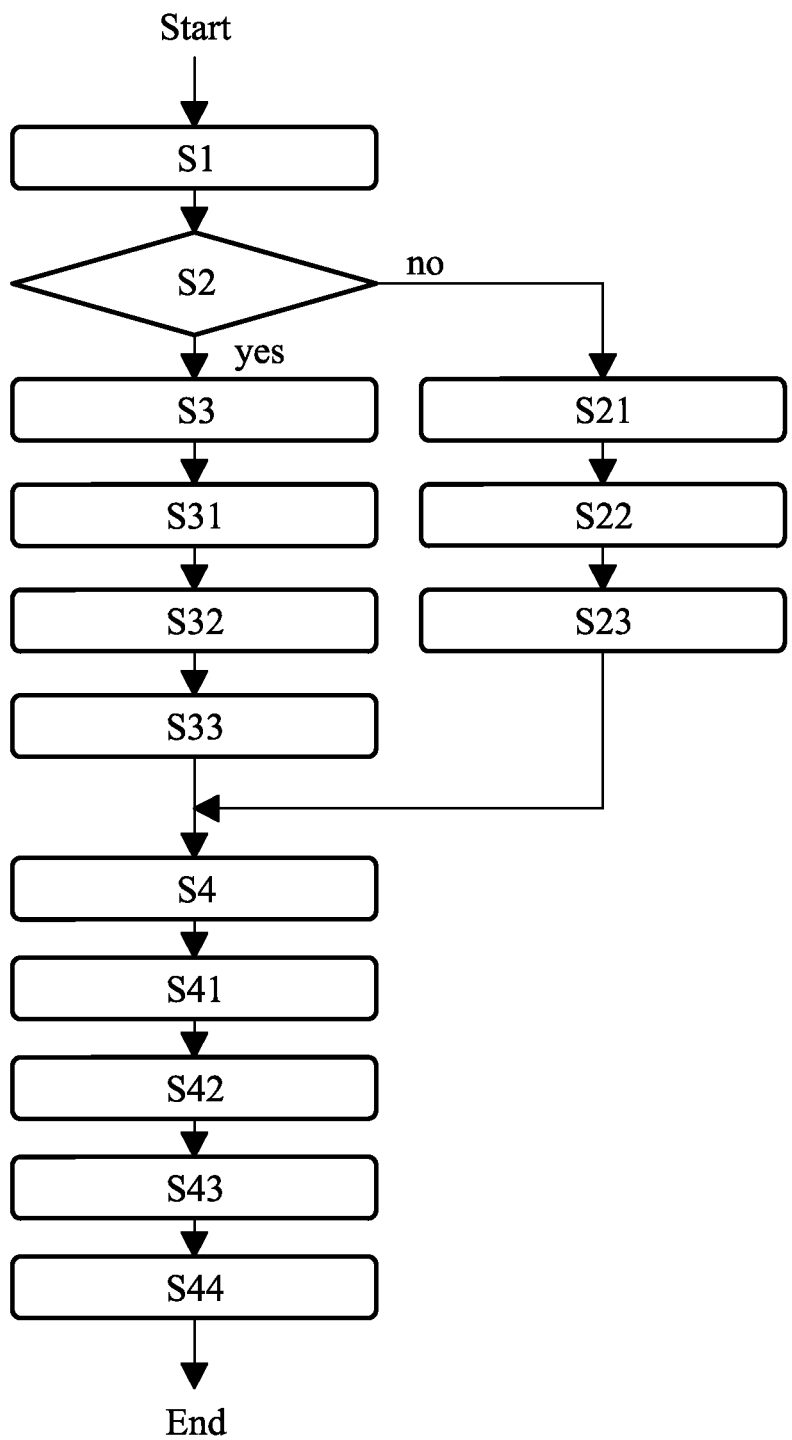
FIG. 3 is a flowchart of the control method of the synchronous motor.

Refer to FIG. 3, it is the flowchart of a control method of the synchronous motor in present invention. The control method of synchronous motor includes the following steps:

Step (S1): Setting an initial value to the internal parameters of the digital signal processor 8.

Step (S2): Choosing whether or not to execute the position control program of the rotor, and if yes, executing the step (S21), the block diagram of executing the position control program can refer to FIG. 4; if not, step (S3) is executed.

Step (S21): Producing a rotor position command $\theta^*_{rm}$.

Step (S22): The detector 6 reads the rotor position $\theta_{rm}$ after accepting the rotor position command $\theta^*_{rm}$, then the differentiator 12 calculates the rotor speed $\omega_{rm}$ according to the rotor position $\theta_{rm}$.

Step (S23): Get the quadrant current $i_{qs}$.

Step (S3): Executing the speed control program of rotor, the block diagram of executing speed control program can refer to FIG. 5.

Step (S31): Producing a rotor speed command $\omega^*_{rm}$.

Step (S32): The detector 6 reads the rotor position $\theta_{rm}$, after accepting the rotor position command $\omega^*_{rm}$, then the differentiator 12 calculates the rotor speed $\omega_{rm}$ according to the rotor position $\theta_{rm}$.

Step (S33): Get the quadrant current $i_{qs}$.

Step (S4): Executing the current control program, the block diagram of executing current control program can refer to FIG. 6. Besides, detecting the synchronous motor 1 to obtain the first phase current $i_{as}$, the second phase current $i_{bs}$ and the third phase current $i_{cs}$.

Step (S41): Using the first phase current $i_{as}$ and the second phase current $i_{bs}$ to get the third phase current $i_{cs}$, and digitizing the first phase current $i_{as}$, the second phase current $i_{bs}$ and the third phase current $i_{cs}$ by the analog to digital converter 3. The synchronous motor 1 has a neutral point, that is, the sum of the first phase current $i_{as}$, the second phase current $i_{bs}$ and the third phase current $i_{cs}$ is equal to zero. Therefore, the third phase current $i_{cs}$ can use $i_{cs}=-(i_{as}+i_{bs})$ to obtain, and the result is same with actual measurement.

Step (S42): Make the first phase current $i_{as}$, the second phase current $i_{bs}$ and the third phase current $i_{cs}$ process the first coordinate axis, transformation 9a, and using the quadrant axis current $i_{qs}$ to produce the direct axis current $i_{ds}$. The formula of the first coordinate axis transformation 9a is:

$$\begin{bmatrix} i_{ds} \\ i_{qs} \end{bmatrix} = \begin{bmatrix} \cos(\theta_{rm}) & \cos\left(\theta_{rm} - \frac{2\pi}{3}\right) & \cos\left(\theta_{rm} + \frac{2\pi}{3}\right) \\ -\sin(\theta_{rm}) & -\sin\left(\theta_{rm} - \frac{2\pi}{3}\right) & -\sin\left(\theta_{rm} + \frac{2\pi}{3}\right) \end{bmatrix} \begin{bmatrix} i_{as} \\ i_{bs} \\ i_{cs} \end{bmatrix}$$

Step (S43): Make the first phase current $i_{as}$ and the second phase current $i_{bs}$ converted to output the direct axis voltage command $v^*_{ds}$ and the quadrant axis voltage command $v^*_{qs}$.

Step (S44): Make the direct axis voltage command $v^*_{ds}$ and the quadrant axis voltage command $v^*_{qs}$ process the second coordinate axis transformation 9b, in order to produce the α axis voltage command $v^*_\alpha$ and β axis voltage command $v^*_\beta$. Then, make the α axis voltage command $v^*_\alpha$ and β axis voltage command $v^*_\beta$ execute a pulse width modulation to obtain a trigger signal and control the synchronous motor 1. The formula of the second coordinate axis transformation 9b is:

$$\begin{bmatrix} v^*_\alpha \\ v^*_\beta \end{bmatrix} = \begin{bmatrix} \cos(\theta_{rm}) & -\sin(\theta_{rm}) \\ \sin(\theta_{rm}) & \cos(\theta_{rm}) \end{bmatrix} \begin{bmatrix} v^*_{ds} \\ v^*_{ds} \end{bmatrix}$$

Figure 4:
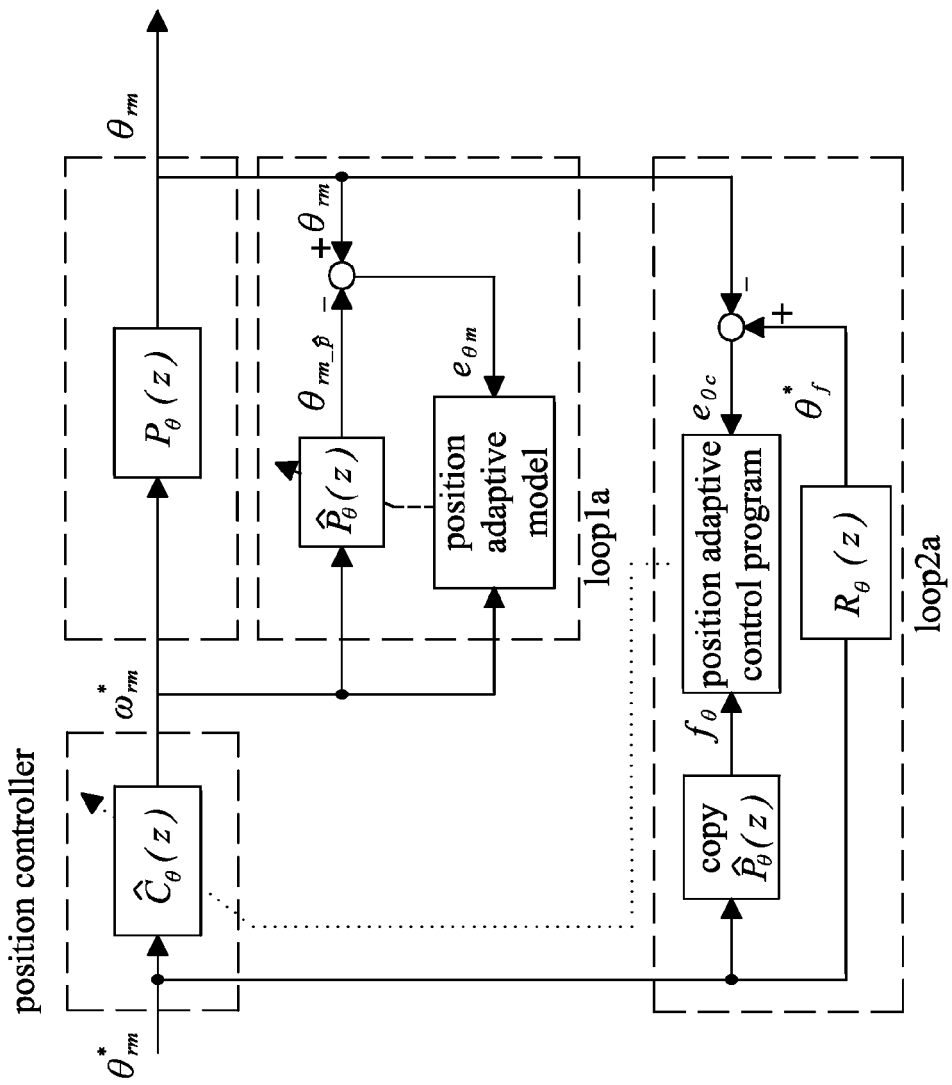
FIG. 4 is an architecture chart of the position control program.

Refer to FIG. 4, it is the architecture diagram of the position control program. $P_\theta(Z)$ is a system controlled by the rotor position $\theta_{rm}$. The loop 1*a* is the adaptive control method of position, which includes establishing a position adaptive model, and establishing a position estimating model $\hat{P}_\theta(Z)$. The loop 1*a* uses the rotor position $\theta_{rm}$ to establish the position adaptive model, then estimate the position adaptive model by the position estimating model $\hat{P}_\theta(Z)$, and output the estimated rotor position $\theta_{rm\_\hat{P}}$. Besides, The loop 1*a* applies the least-mean-square algorithm to get the error $e_{\theta_m}$ between the rotor position $\theta_{rm}$ and the estimated rotor position $\theta_{rm\_\hat{P}}$. According to the error $e_{\theta_m}$, the loop 1*a* adjusts the parameter of the position adaptive model, in order to achieve the effect that the error $e_{\theta_m}$ gradually converging. When the error $e_{\theta_m}$ converge to zero, the estimated rotor position $\theta_{rm\_\hat{P}}$ estimated by the position estimating model $\hat{P}_\theta(Z)$ and the actual rotor position $\theta_{rm}$ output from the controlled system $P_\theta(Z)$ are the same, so as to complete the position control program of loop 1*a*.

Please continued refer to FIG. 4, loop 2*a* is the control method of the rotor position controller $\hat{C}_\theta(Z)$, which includes a position adaptive control program, $R_\theta(Z)$ is a reference model of the rotor position command $\theta^*_{rm}$. The rotor position command $\theta^*_{rm}$ passes through the reference model $R_\theta(Z)$, to obtain a smooth rotor position command $\theta^*_f$. The estimating model $\hat{P}_\theta(Z)$ of the loop 1*a* is copied into the loop 2*a*, for calculating a error $e_{\theta_c}$ between rotor position $\theta_{rm}$ and the rotor position command $\theta^*_{rm}$. According to the error $e_{\theta_c}$, the position adaptive control program uses the least-mean-square algorithm to adjust the parameter of the position controller $\hat{C}_\theta(Z)$. When the error converge to zero, it means that the rotor position $\theta_{rm}$ output from the controlled system $P_\theta(Z)$ can be closer to the rotor position command $\theta^*_f$ in the control of position controller $\hat{C}_\theta(Z)$, so as to complete the control method of position controller in loop 2*a*.

Figure 5:
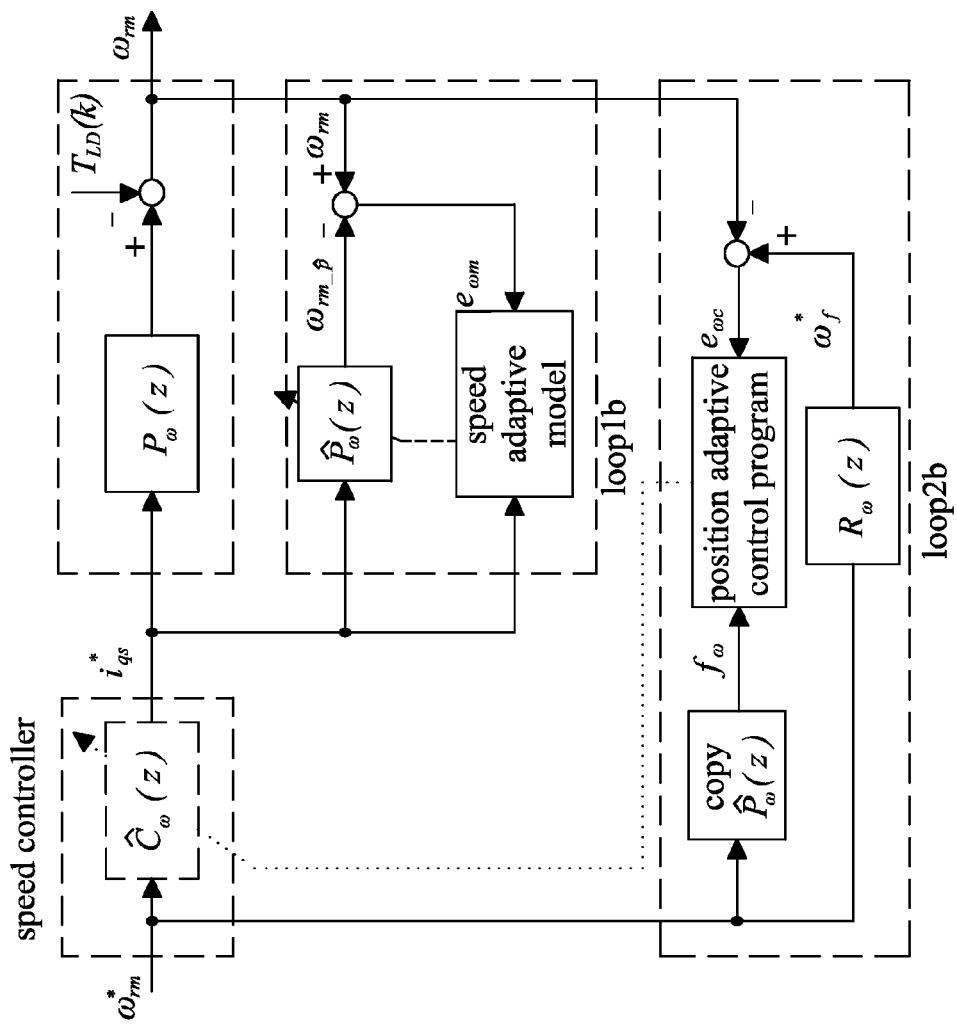
FIG. 5 is an architecture chart of the speed control program.

Refer to FIG. 5, it is the architecture diagram of the speed control program, $P_\omega(Z)$ is a system controlled by the rotor speed $\omega_{rm}$. The controlled system $P_\omega(Z)$ has the additional interference $T_{LD}(K)$. The loop 1*b* is the adaptive control method of speed, which includes establishing a speed adaptive model, and establishing a speed estimating model $\hat{P}_\omega(Z)$. The loop 1*b* uses the rotor speed $\omega_{rm}$ to establish the speed adaptive model, then estimate the speed adaptive model by the speed estimating model $\hat{P}_\omega(Z)$, and output the estimated rotor speed $\omega_{rm\_\hat{P}}$. Besides, the loop 1*b* applies the least-mean-square algorithm to get the error $e_{\omega_m}$ between the rotor speed $\omega_{rm}$ and the estimated rotor speed $\omega_{rm\_\hat{P}}$. According to the error $e_{\omega_m}$, the loop 1*b* adjusts the parameter of the speed adaptive model, in order to achieve the effect that the error $e_{\omega_m}$ gradually converging. When the error $e_{\omega_m}$ converge to zero, the estimated rotor speed $\omega_{rm\_\hat{P}}$ estimated by the speed estimating model $\hat{P}_\omega(Z)$ and the actual rotor speed $\omega_{rm}$ output from the controlled system $P_\omega(Z)$ are the same, so as to complete the speed control program of loop 1*b*.

Please continued refer to FIG. 5, loop 2*b* is the control method of the rotor speed controller $\hat{C}_\omega(Z)$, which includes a speed adaptive control program, $R_\omega(Z)$ is a reference model of the rotor speed command $\omega^*_{rm}$. The rotor speed command $\omega^*_{rm}$ passes through the reference model $R_\omega(Z)$, to obtain a smooth rotor speed command $\omega^*_f$. The estimating model $\hat{P}_\omega(Z)$ of the loop 1*b* is copied into the loop 2*b* for calculating a error $e_{\omega c}$ between rotor speed $\omega_{rm}$ and the rotor speed command $\omega^*_{rm}$. According to the error $e_{\omega c}$, the speed adaptive control program uses the least-mean-square algorithm to adjust the parameter of the speed controller $\hat{C}_\omega(Z)$. When the error converge to zero, it means that the rotor speed $\omega_{rm}$ output from the controlled system $P_\omega(Z)$ can be closer to the rotor speed command $\omega^*_f$ in the control of speed controller $\hat{C}_\omega(Z)$, so as to complete the control method of speed controller in loop 2*b*.

Figure 6:
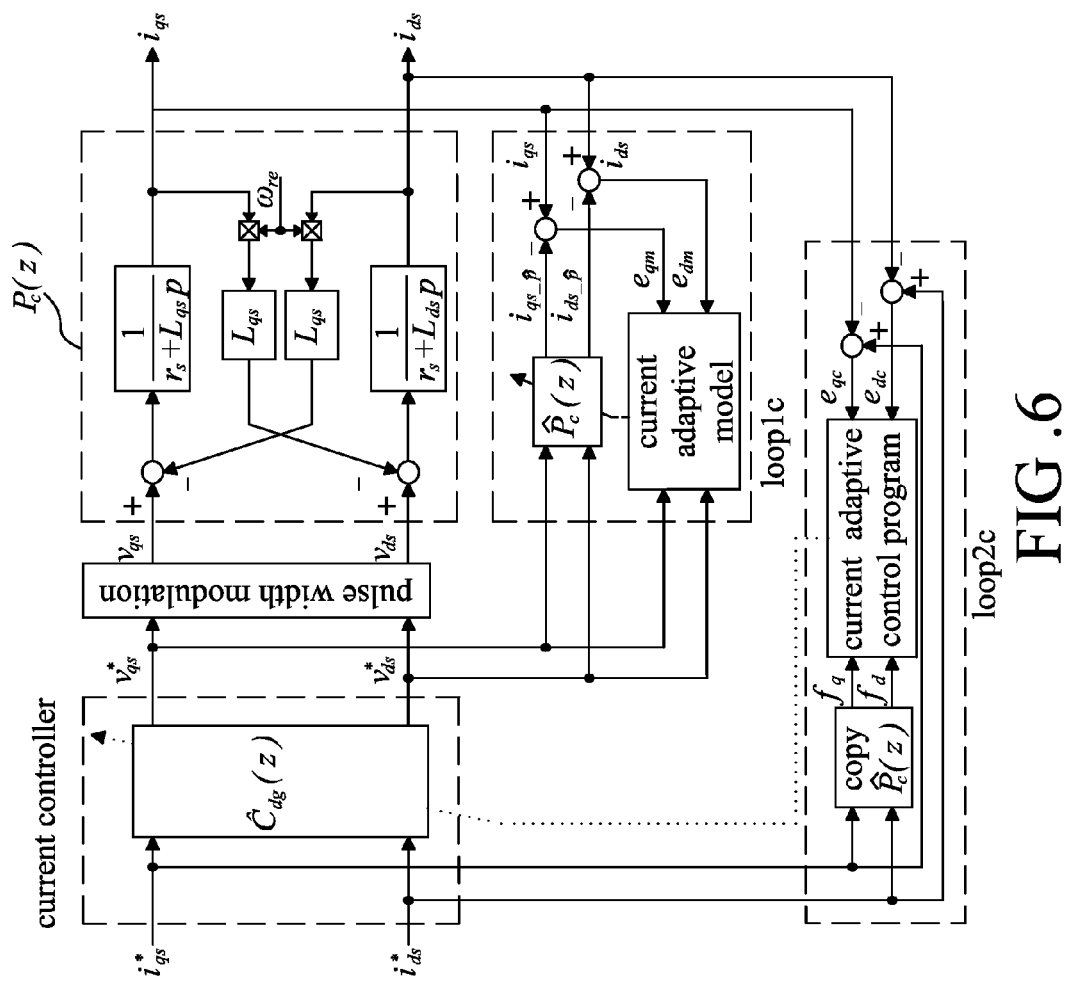
FIG. 6 is an architecture chart of the current control program.

Refer to FIG. 6, it is the architecture diagram of the current control program. $P_c(Z)$ is a system controlled by the direct axis current $i_{ds}$ and the quadrant axis current $i_{qs}$. The loop 1*c* is the adaptive control method of current, which includes establishing a current adaptive model, and establishing a current estimating model $\hat{P}_c(Z)$. The loop 1*c* uses the direct axis current $i_{ds}$ and the quadrant axis current $i_{qs}$ to establish the current adaptive model, then estimate the current adaptive model by the current estimating model $\hat{P}_c(Z)$, and output the estimated direct axis current $i_{ds\_\hat{P}}$ and the quadrant axis current $i_{qs\_\hat{P}}$. Besides, the loop 1*c* applies the least-mean-square algorithm to get the error $e_{dm}$ between the direct axis current $i_{ds}$ and the estimated direct axis current $i_{ds\_\hat{P}}$, and the error $e_{dm}$ between the quadrant axis current $i_{qs}$ and the quadrant axis current $i_{qs\_\hat{P}}$. According to the error $e_{dm}$, $e_{qm}$, adjust the parameter of the current adaptive model, in order to achieve the effect that the error $e_{dm}$, $e_{qm}$ gradually converging. When the error $e_{dm}$, $e_{qm}$ converge to zero, the estimated direct axis current $i_{ds\_\hat{P}}$, the quadrant axis $i_{qs\_\hat{P}}$ estimated by the current estimating model $\hat{P}_c(Z)$ are the same. The actual direct axis current $i_{ds}$, the quadrant axis $i_{qs}$ output by the controlled system $P_c(Z)$ are also the same, so that complete the current control program of loop 1*c*.

Please continued refer to FIG. 6, loop 2*c* is the control method of the current controller $\hat{C}_{dq}(Z)$, which includes a current adaptive control program. $i^*_{ds}$ is the direct axis current command and $i^*_{qs}$ is the quadrant axis current command. The estimating model $\hat{P}_c(Z)$ of the loop 1*c* is copied into the loop 2*c*, to obtain a error $e_{dc}$ between the direct axis current $i_{ds}$ and the direct axis current command $i^*_{ds}$, as well as the error $e_{qc}$ between the quadrant axis current $i_{qs}$ and the quadrant axis current command $i^*_{qs}$. According to the error $e_{dc}$, $e_{qc}$ the current adaptive control program uses the least-mean-square algorithm to adjust the parameter of the current controller $\hat{C}_{dq}(Z)$. When the error $e_{dc}$, $e_{qc}$ converge to zero, it means that the direct axis current $i_{ds}$ a output from the controlled system $P_c(Z)$ can be closer to the direct axis current command $i^*_{ds}$ in the control of current controller $\hat{C}_{dq}(Z)$, and the quadrant axis current $i^*_{qs}$ output from the controlled system $P_c(Z)$ can be closer to the quadrant axis current command $i^*_{qs}$ in the control of current controller $\hat{C}_{dq}(Z)$, so as to complete the control method of speed controller in loop 2*c*.

Figure 7:
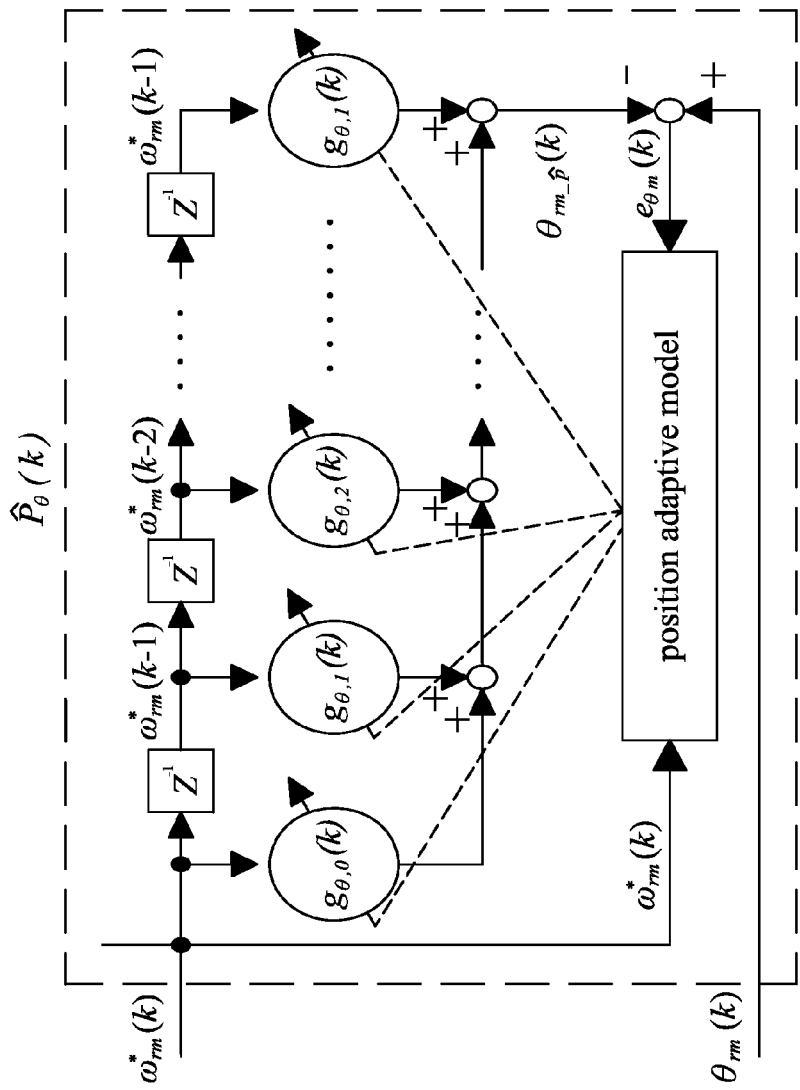
FIG. 7 is an architecture chart of the least-mean-square algorithm of the loop 1$a$ and position controller.

Refer to FIG. 7, it is the architecture diagram of the circuit of the loop 1*a* and the least-mean-square algorithm of position controller. $\omega^*_{rm}$ is a speed command, defined k as a sample sequence, $g_\theta(k)$ is the control parameter of the position controller. $\theta_{rm}(k)$ is the actual rotor position, and $\theta_{rm\_\hat{P}}(k)$ is the estimated rotor position, so the $e_{\theta_m}(k)$ is the error between the actual rotor position $\theta_{rm}(k)$ the estimated rotor position $\theta_{rm\_\hat{P}}(k)$. the loop 1*a* uses a nonlinear programming optimization to dynamically adjust control parameters of the position controller $g_0(k)$, so that the estimated rotor position $\theta_{rm\_\hat{P}}(k)$ can be closer to the actual rotor position $\theta_{rm}(k)$.

Figure 8:
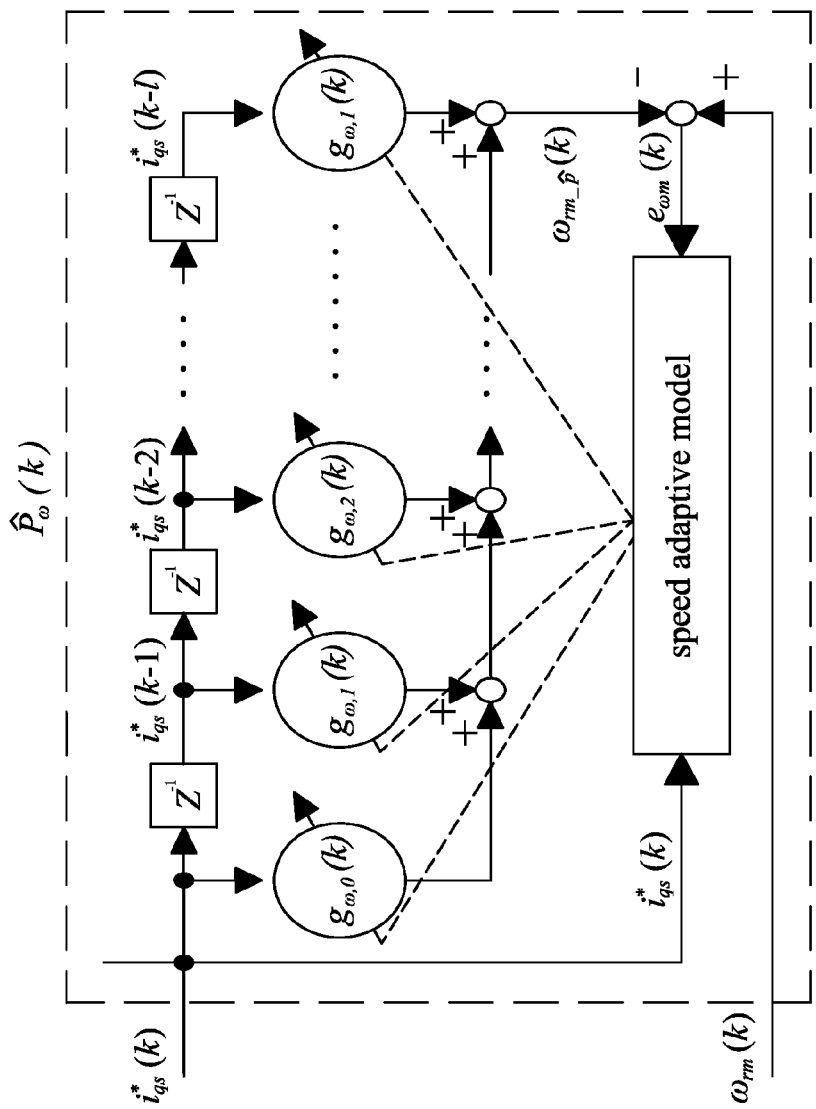
FIG. 8 is an architecture chart of the least-mean-square algorithm of the loop 1$b$ and speed controller.

Refer to FIG. 8, it is the architecture diagram of the circuit of the loop 1*b* and the least-mean-square algorithm of speed controller. $i^*_{qs}$ is the direct axis current command, k is a sample sequence, $g_\omega(k)$ is the control parameter of the speed controller. $\omega_{rm}(k)$ is the actual rotor speed, and $\omega_{rm\_\hat{P}}(k)$ is the estimated rotor speed, so the $e_{\omega_m}(k)$ is the error between the actual rotor speed $\omega_{rm}(k)$ the estimated rotor speed $\omega_{rm\_\hat{P}}(k)$. The loop 1*b* uses a nonlinear programming optimization to dynamically adjust control parameters of the speed controller $g_\omega(k)$, so that the estimated rotor speed $\omega_{rm\_\hat{P}}(k)$ can be closer to the actual rotor speed $\omega_{rm}(k)$.

Figure 9:
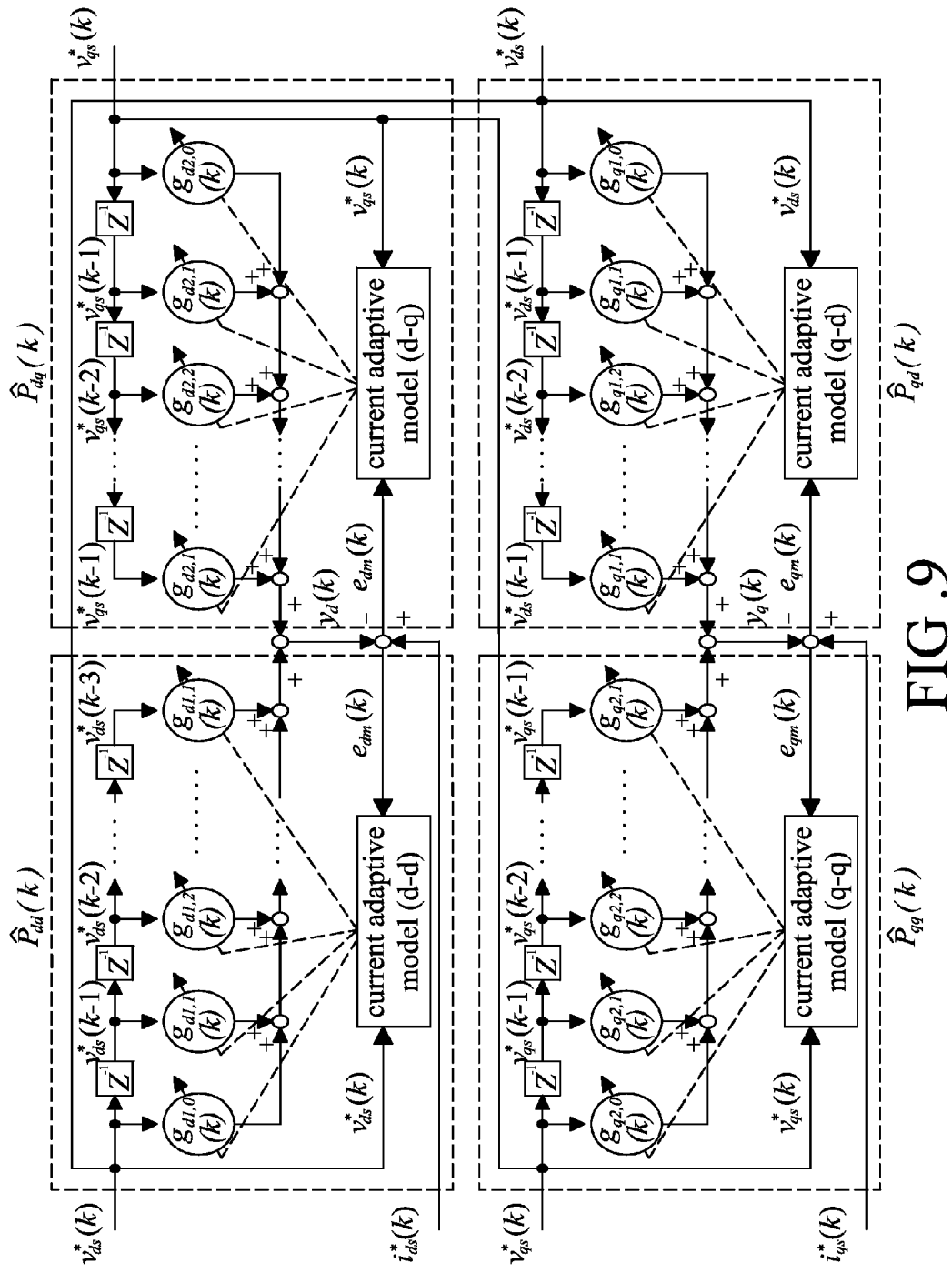
FIG. 9 is an architecture chart of the least-mean-square algorithm of the loop 1$c$ and current controller.

Refer to FIG. 9, it is the architecture diagram of the circuit of the loop 1c and the least-mean-square algorithm of current controller. $v^*_{ds}$ is the direct axis voltage command and $v^*_{qs}$ is the quadrant axis voltage command, k is a sample sequence, $G_{d1}(k)$, $G_{d2}(k)$, $G_{q1}(k)$, $G_{q2}(k)$ are the control parameters of the current controller, $i_{ds}(k)$ is the actual direct axis current, and $i_{ds}(k)$ is the quadrant axis current. The $y_d(k)$ is the estimated direct axis current, and the $y_q(k)$ is the estimated quadrant axis current, so the $e_{dm}(k)$ is the error between the actual direct axis current $i_{ds}(k)$ and the estimated direct axis current $y_d(k)$, as well as the $e_{qm}(k)$ is the error between the actual quadrant axis current $i_{qs}(k)$ and the estimated quadrant axis current $y_q(k)$. The loop 1c uses a nonlinear programming optimization to dynamically adjust control parameters of the current controller $G_{d1}(k)$, $G_{d2}(k)$, $G_{q1}(k)$, $G_{q2}(k)$, so that the estimated direct axis current $y_d(k)$ can be closer to the actual direct axis current $i_{ds}(k)$, and the quadrant axis current $y_q(k)$ can be closer to the actual quadrant axis current $i_{qs}(k)$.

Figure 10:
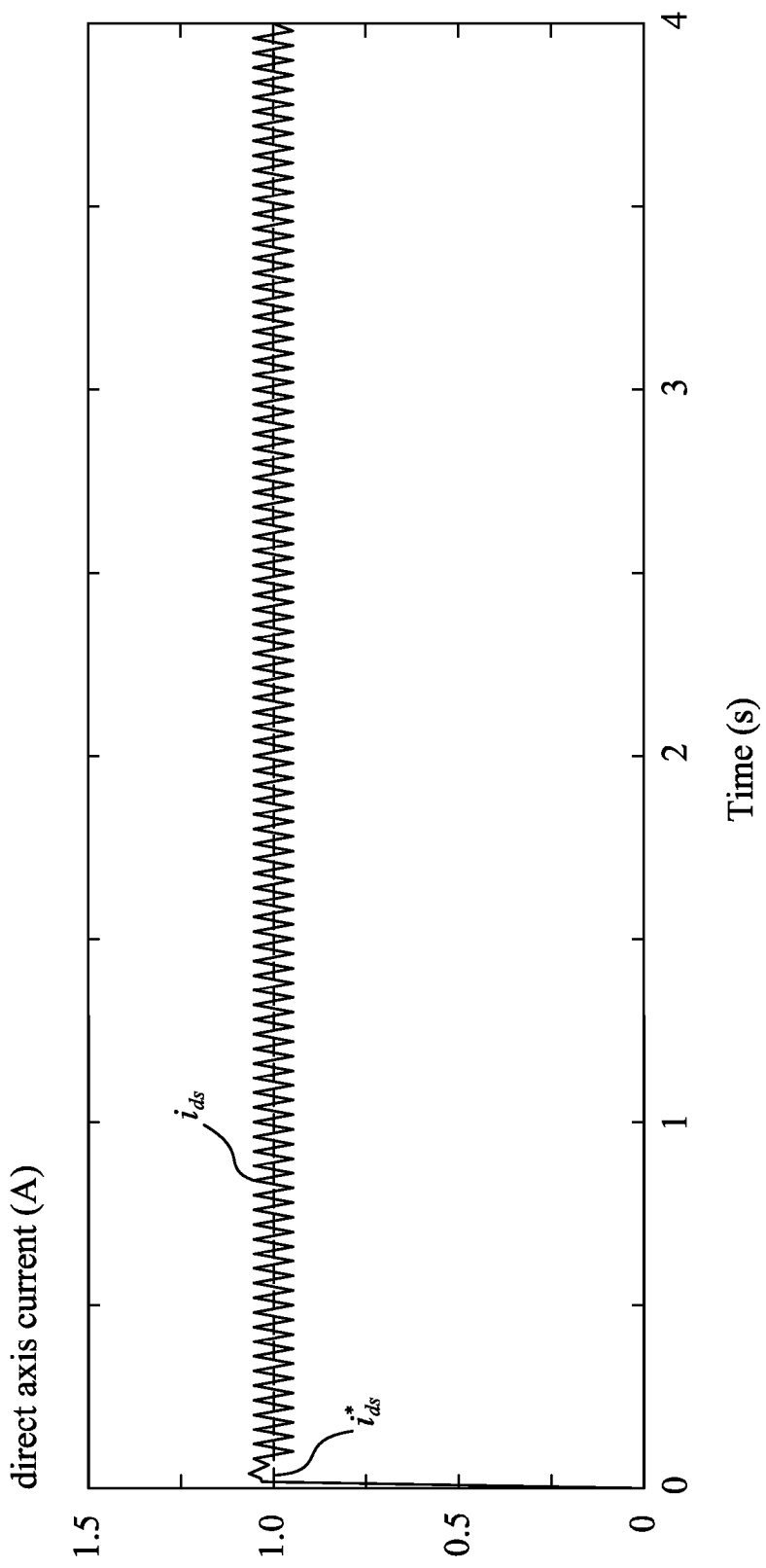
FIG. 10 is a measured drawing of the direct axis current and the response of direct axis current command.
Figure 11:
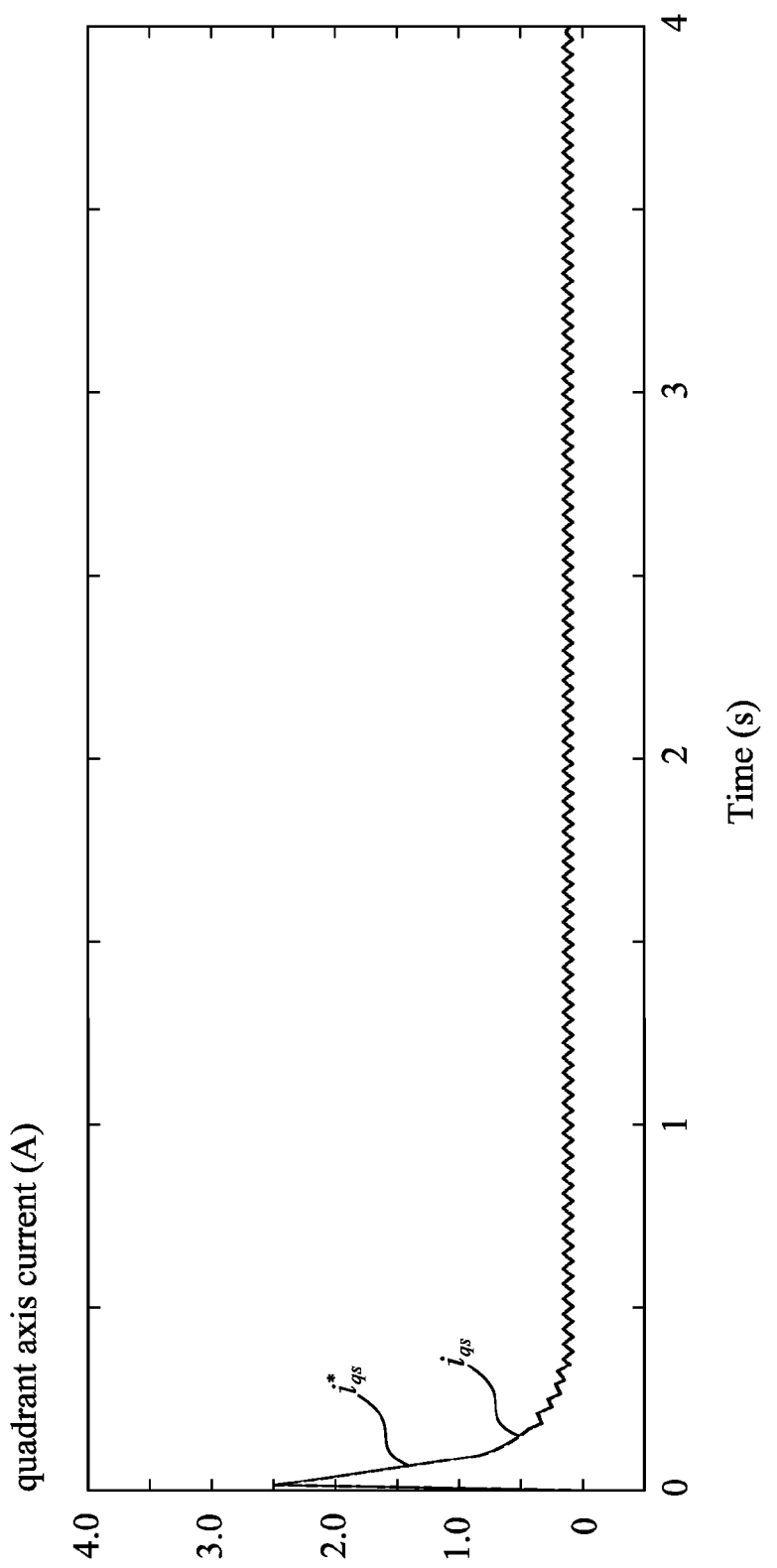
FIG. 11 is a measured drawing of the quadrant axis current and the response of the quadrant axis current command.
Figure 12:
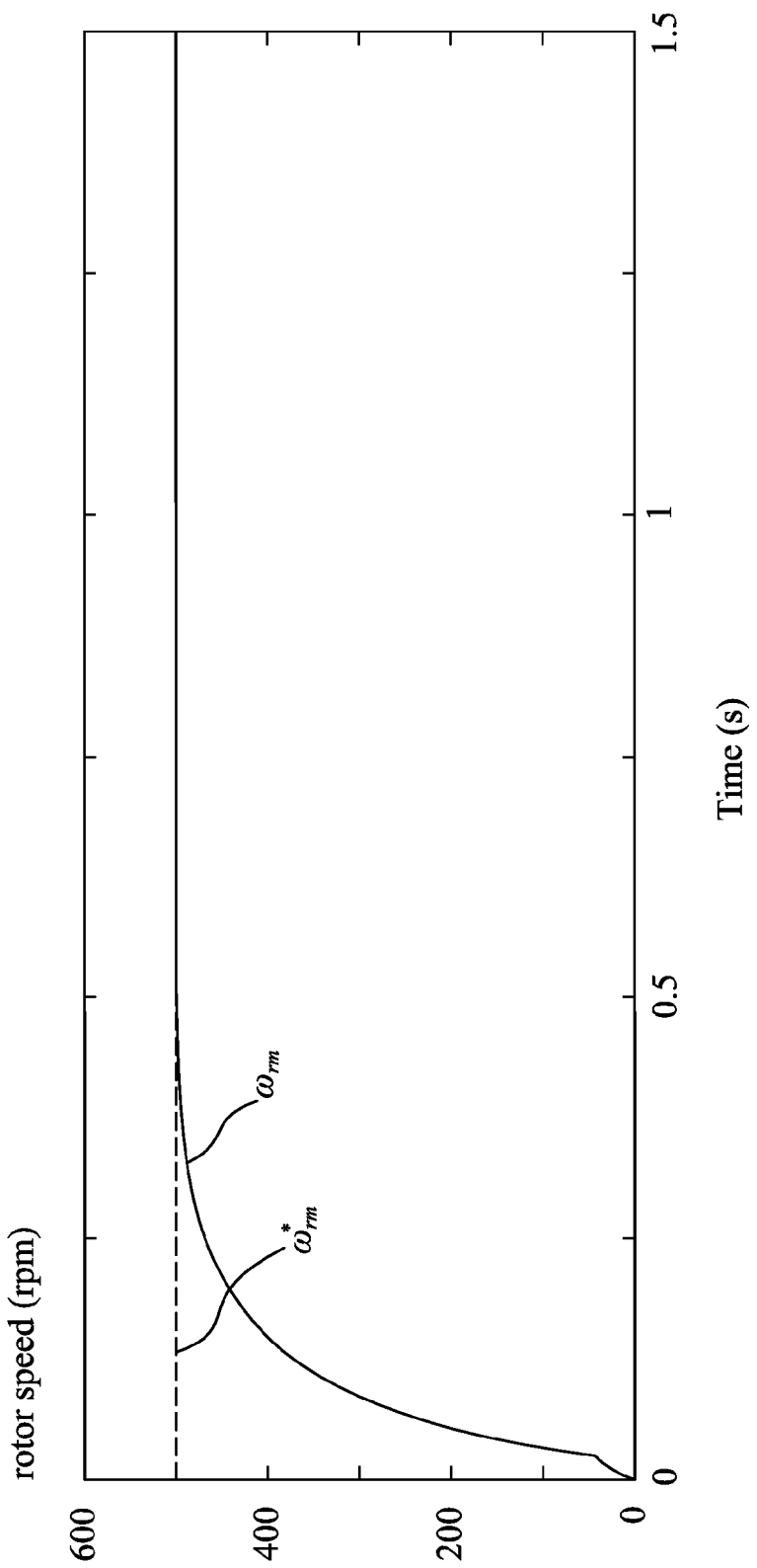
FIG. 12 is a measured drawing of the rotor speed and the response of rotor speed command.
Figure 13:
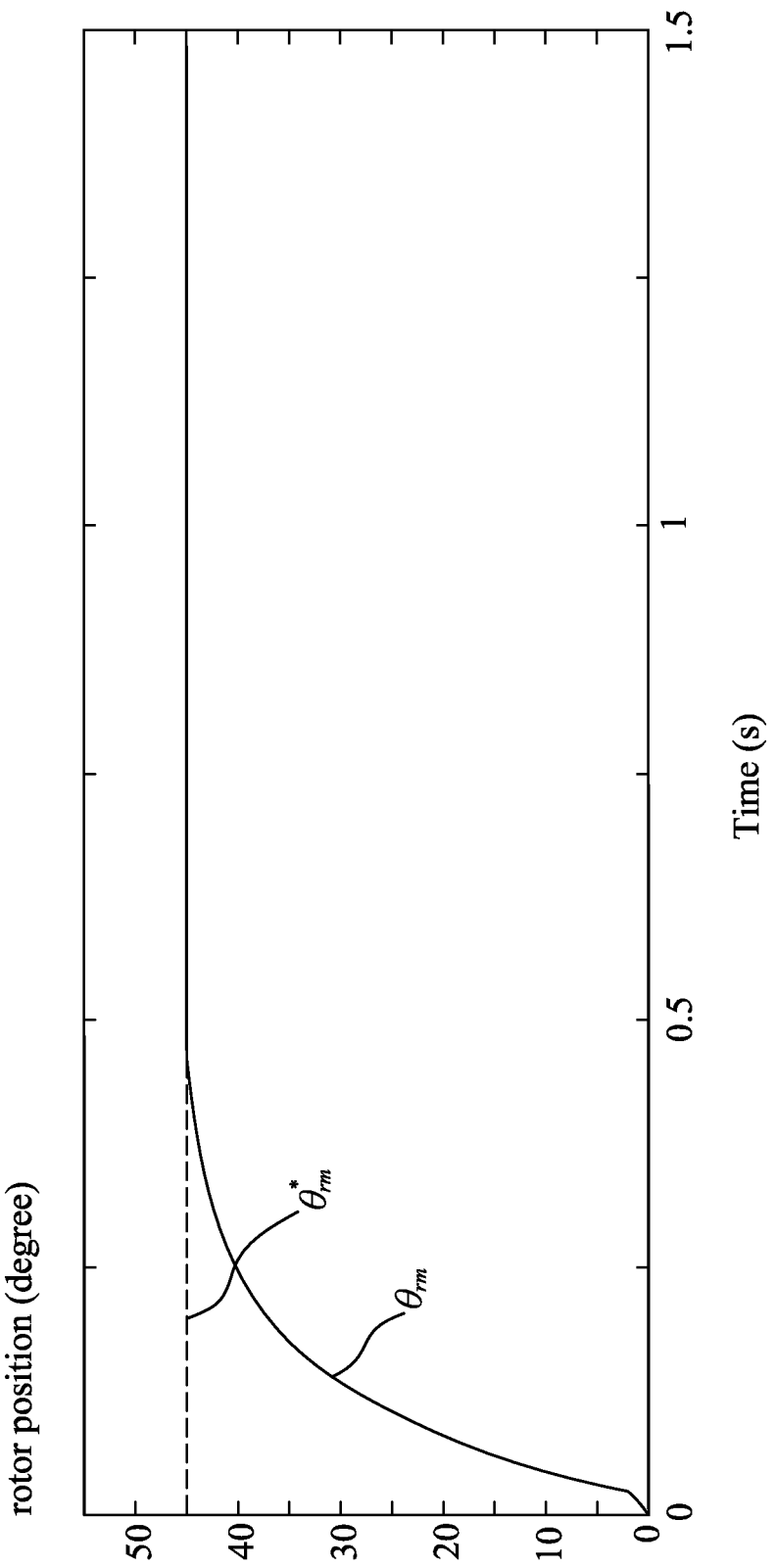
FIG. 13 is a measured drawing of the rotor position and the response of rotor position command.

Refer to FIG. 10, it is the response measuring diagram of the direct axis current $i_{ds}$ and the direct axis current command $i^*_{ds}$, which can match with FIG. 6 and be seen that under the operation of the current control program, the direct axis current command $i^*_{ds}$ and the direct axis current $i_{ds}$ are nearly identical. Refer to FIG. 11, it is the response measuring diagram of quadrant axis current $i_{qs}$ and the quadrant axis current command $i^*_{qs}$, which can match with FIG. 6 and be seen that under the operation of the current control program, the quadrant axis current command $i^*_{qs}$ and the quadrant axis current $i_{qs}$ are nearly identical. Refer to FIG. 12, it is the response measuring diagram of rotor speed $\omega_{rm}$ and the rotor speed command $\omega^*_{rm}$, which can match with FIG. 5 and be seen that under the operation of the speed control program, the rotor speed command $\omega^*_{rm}$ and rotor speed $\omega_{rm}$ are nearly identical. Refer to FIG. 13, it is the response measuring diagram of rotor position $\theta_{rm}$ and the rotor position command $\theta^*_{rm}$, which can match with FIG. 4 and be seen that under the operation of the position control program, the rotor position command $\theta^*_{rm}$ and rotor position $\theta_{rm}$ are nearly identical.

During the design of the above-described embodiment of the position, speed and current control program, which can also apply to the drive system of the synchronous motor from low speed to high speed. Under the influence of the changes of the parameters of the controlled system and the external interference, first, obtain the accurate estimated controlled system model, then design the controller. Therefore, the designed current control, position control and speed control programs can ensure good control performance for the alterations of the drive system of the synchronous motor.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A controlling method of a synchronous motor, the synchronous motor comprising a stator, a rotor, a direct axis and a quadrant axis, the rotor having an actual rotor position and a speed, and the direct axis and the quadrant axis rotating with the rotor, the controlling method of the synchronous motor comprising:

providing a position control program of the rotor, comprising steps of establishing a positive adaptive model, a position estimating model, and a reference model;

providing a speed control program of the rotor and a current control program of the stator;

executing either the position control program or the speed control program to produce a quadrant axis current, wherein executing the position control program comprising steps of:

estimating the positive adaptive model to generate an estimated rotor position by the position estimating model;

applying an algorithm to get a first error between the actual rotor position and the estimated rotor position;

adjusting the positive adaptive model to make the first error gradually converging to zero;

generating a smooth rotor position command by the reference model, wherein the smooth rotor position command represents a desired rotor position;

calculating a second error between the actual rotor position and the smooth rotor position command by the position estimating model when the first error converging to zero; and adjusting the actual rotor position according to the second error, in order to make the second error gradually converging to zero;

executing the current control program;

detecting the synchronous motor to obtain a first phase current, a second phase current and a third phase current;

processing a first coordinate axis transformation according the adjusted position and the first phase current, the second phase current and the third phase current;

calculating a direct axis current according to the quadrant axis current and the result of the first coordinate axis transformation;

converting the direct axis current and the quadrant axis current into a direct axis voltage command and a quadrant axis voltage command by processing a second coordinate axis transformation according to the adjusted position;

and executing a pulse width modulation for the direct axis voltage command and the quadrant axis voltage command, so as to get a trigger signal for controlling the synchronous motor.

2. The controlling method of the synchronous motor of claim 1, wherein the directions of the first phase current, the second phase current, and the third phase current forming an angle of 120-degree with respect to each other, while each of the first phase current and the second phase current is obtained by directly measuring with an instrument and the third phase current is calculated by the direct measurement results of the first phase current and the second phase current.

3. The controlling method of synchronous motor of claim 1, wherein the step of executing the current control program further comprising:
    producing a rotor position command; and
    reading a rotor position of the rotor after accepting the rotor position command, then calculating a rotor speed of the rotor.

4. The controlling method of synchronous motor of claim 1, wherein the step of executing the speed control program further comprising:
    producing a rotor speed command; and
    reading a rotor position after accepting the rotor speed command, then calculating a rotor speed.

5. The controlling method of synchronous motor of claim 1, further comprising:
    providing a desired output current and an actual output current, and applying a least-mean-square algorithm with a nonlinear programming optimization to make the error between the desired output current and the actual output current converge to zero.

6. The controlling method of synchronous motor of claim 1, further comprising:
    providing a desired rotor speed and an actual rotor speed, and applying a least-mean-square algorithm with a nonlinear programming optimization to make the error between the desired rotor speed and the actual rotor speed converge to zero.

7. The controlling method of synchronous motor of claim 1, further comprising:
    applying a least-mean-square algorithm with a nonlinear programming optimization to make the second error converge to zero.

* * * * *